United States Patent
Altinsel

(10) Patent No.: US 11,376,488 B1
(45) Date of Patent: Jul. 5, 2022

(54) TWO-CARD SLEEVE APPARATUS

(71) Applicant: Penguin Magic, Inc., Rancho Cordova, CA (US)

(72) Inventor: Acar Altinsel, Rancho Cordova, CA (US)

(73) Assignee: PENGUIN MAGIC, INC., Rancho Cordova, CA (US)

( * ) Notice: Subject to any disclaimer, the term of this patent is extended or adjusted under 35 U.S.C. 154(b) by 0 days.

(21) Appl. No.: 17/358,350

(22) Filed: Jun. 25, 2021

Related U.S. Application Data

(63) Continuation of application No. 17/346,697, filed on Jun. 14, 2021.

(51) Int. Cl.
*A63F 1/10* (2006.01)

(52) U.S. Cl.
CPC ..................................... *A63F 1/10* (2013.01)

(58) Field of Classification Search
CPC ........... A63F 1/062; A63F 1/10; B65D 65/10; B65D 75/30; A63J 21/00; A63J 5/02; A45C 11/182
See application file for complete search history.

(56) References Cited

U.S. PATENT DOCUMENTS

| | | | | |
|---|---|---|---|---|
| 3,596,913 A | * | 8/1971 | Charves | A63F 9/00 273/138.1 |
| 5,573,110 A | * | 11/1996 | Nguyen | B42F 7/065 150/147 |
| 5,700,036 A | * | 12/1997 | Smith, III | A45C 11/182 283/72 |
| D527,899 S | * | 9/2006 | Morehead | D3/247 |
| D760,496 S | * | 7/2016 | Schioll | D3/247 |
| 10,420,403 B1 | * | 9/2019 | Calder | A45C 1/06 |
| 2016/0331091 A1 | * | 11/2016 | Hall | A45C 1/06 |
| 2017/0096270 A1 | * | 4/2017 | Jauregui | A63F 1/10 |

* cited by examiner

*Primary Examiner* — Michael D Dennis

(74) *Attorney, Agent, or Firm* — Polsinelli PC

(57) ABSTRACT

A two-card sleeve apparatus is described. The two-card sleeve apparatus may include a first transparent layer, an opaque layer, and a second transparent layer. The two-card sleeve apparatus may be used to safely store or display two or more trading cards.

11 Claims, 6 Drawing Sheets

TWO-CARD SLEEVE APPARATUS

CROSS-REFERENCE TO RELATED APPLICATIONS

This application is a continuation of U.S. patent application Ser. No. 17/346,697, filed Jun. 14, 2021, the contents of which is hereby incorporated by reference in its entirety.

FIELD

The present disclosure relates generally to a two-card sleeve apparatus. In at least one example, the present disclosure relates to an apparatus operable to hold two cards.

BACKGROUND

Card collectors have great interest in protecting and storing the cards they collect. Whether the cards be sports trading cards, fantasy game related trading cards, or other types of trading cards, the value of the card depends greatly on the condition and quality of the card. Card collectors are constantly searching for new, easier, and more efficient ways to protect and store the cards they invest in. Current card sleeves require collectors to store only one card per sleeve in what are known as penny sleeves. When two cards are placed in a single sleeve the cards will stick together causing damage to the cards. Additionally, magicians have a need for a two-card sleeve apparatus to be used in magic tricks involving the changing of two cards.

As presented herein, a two-card sleeve apparatus has been developed to store, protect, and display trading cards more effectively as well as to be used in magic tricks involving two cards.

BRIEF SUMMARY

Provided herein is a two-card sleeve apparatus operable to store or display two or more trading cards. The two-card sleeve apparatus may include two transparent layers separated by an opaque middle layer.

An aspect of the present disclosure provides a two-card sleeve comprising: a first transparent layer having an inner surface and an outer surface; a second transparent layer having an inner surface and an outer surface; and an opaque layer having a first inner surface and a second inner surface, the opaque layer attached to the first transparent layer and the second transparent layer to form a first pocket and a second pocket, such that the inner surface of the first transparent layer is adjacent to the first inner surface of the opaque layer, forming the first pocket, and the inner surface of the second transparent layer is adjacent to the second inner surface of the opaque layer, forming the second pocket. The first pocket and the second pocket are operable to each hold a card and the cards are separated by the opaque layer.

In some aspects, the opaque layer has a height greater than a height of the first transparent layer and the second transparent layer. In other aspects, the opaque layer has a height equal to a height of the first transparent layer and the second transparent layer. For example, the first transparent layer and the second transparent layer may have a height of 91 mm and a width of 66 mm, and the opaque layer may have a height of 91 mm and a width of 66 mm. The first pocket and the second pocket each have a depth of up to 100 mm and are operable to hold a card of up to 80 pts.

In additional aspects, the first transparent layer, the second transparent layer, and the opaque layer may be flexible. In further aspects, at least one of the first transparent layer, the second transparent layer, and the opaque layer is rigid. In yet additional aspects, the opaque layer may be partially transparent, partially colored, or solid colored.

The inner surface of the first transparent layer may be attached to first inner surface of the opaque layer along three edges, leaving an opening along a fourth edge. For example, the opening may be at a top edge or a bottom edge of the two-card sleeve apparatus. The inner surface of the second transparent layer is attached to second inner surface of the opaque layer along three edges, leaving an opening along a fourth edge. For example, the opening may be at a top edge or a bottom edge of the two-card sleeve apparatus.

Other aspects and iterations of the invention are described more thoroughly below.

BRIEF DESCRIPTION OF THE DRAWINGS

Implementations of the present technology will now be described, by way of example only, with reference to the attached figures, wherein.

DETAILED DESCRIPTION

Figure 1:
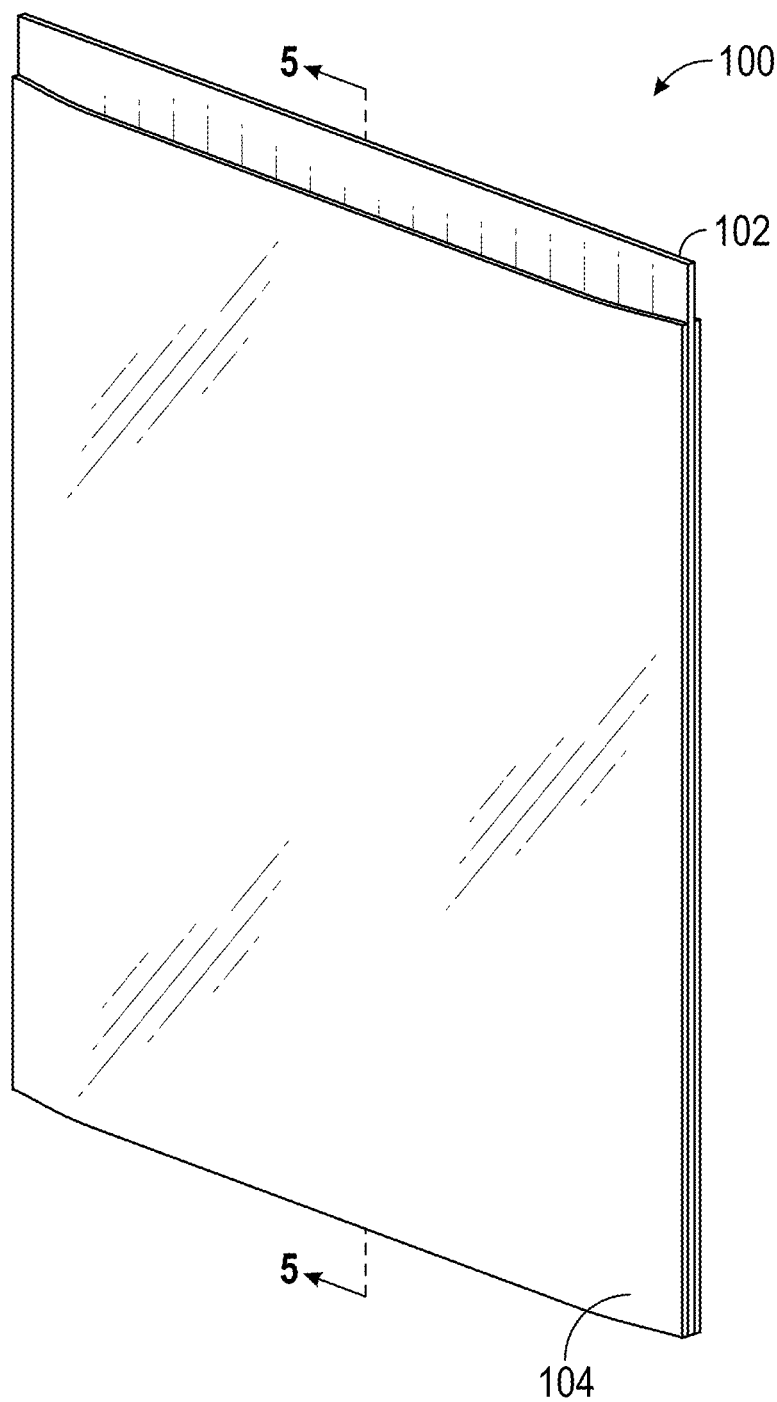
FIG. 1 shows a two-card sleeve apparatus in one example.

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout the above disclosure will now be presented. As used herein, "about" refers to numeric values, including whole numbers, fractions, percentages, etc., whether or not explicitly indicated. The term "about" generally refers to a range of numerical values, for instance, ±0.5-1%, ±1-5% or ±5-10% of the recited value, that one would consider equivalent to the recited value, for example, having the same function or result.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, "substantially cylindrical" means that the object resembles a cylinder but can have one or more deviations from a true cylinder.

The terms "comprising," "including" and "having" are used interchangeably in this disclosure. The terms "comprising," "including" and "having" mean to include, but not necessarily be limited to the things so described.

Provided herein is a two-card sleeve apparatus to store and/or display at least two cards in one apparatus. The two-card sleeve apparatus includes an opaque layer with two inner surfaces. A first transparent layer is attached on three edges to the opaque layer's first inner surface creating a first inner pocket. A second transparent layer is attached on three edges to the opaque layer's second inner surface creating a second inner pocket. In some embodiments, the two-card sleeve is operable to hold two trading cards. Using this design, a card collector may safely store two trading cards in one apparatus without the trading cards sticking together. Additionally, utilizing this design, a magician may be able to perform card tricks by displaying two different cards in the same apparatus.

Referring to FIGS. 1-5, the two-card sleeve apparatus 100 may include a first transparent layer 104, a middle opaque layer 102, and a second transparent layer 106. The transparent layers 104 and 106 each have an inner surface and an outer surface, where the inner surface of each of the transparent layers 104 and 106 faces towards the opaque layer 102 disposed between the first transparent layer 104 and the second transparent layer 106. The opaque layer 102 has a first inner surface and a second inner surface. In an example, the first inner surface of the opaque layer 102 may face the inner surface of the first transparent layer 104 and the second inner surface may face the inner surface of the second transparent layer 106. In some embodiments, the edges of the inner surfaces of the transparent layers 104 and 106 may be attached to the corresponding inner surfaces of the opaque layer 102 on three sides, forming two pockets. Each pocket may be operable to receive a card. In some embodiments, the first and second pockets of the two-card sleeve are each operable to each hold a trading card and the trading cards are separated by the opaque layer. For example, a card may be inserted in each pocket of the two-card sleeve apparatus on either side of the opaque layer.

In an embodiment, the inner surfaces of the transparent layers 104 and 106 may be attached to three sides, bottom, left, and right, of the inner surfaces of the opaque layer 102, forming two pockets 112 and 114 open on the top edge of the two-card sleeve apparatus for a card to be inserted in the two-card sleeve apparatus on either side of the opaque layer. In another embodiment the inner surfaces of the transparent layers 104 and 106 may be attached to three sides, top, left, and right, of the inner surfaces of the opaque layer 102, forming two pockets open on the bottom edge of the two-card sleeve apparatus for a card to be inserted in the two-card sleeve apparatus on either side of the opaque layer. In another example, the inner surfaces of the transparent layers 104 and 106 may be attached to three sides, top, bottom, and left, of the inner surfaces of the opaque layer 102, forming pockets open on the right edge of the two-card sleeve apparatus for a card to be inserted in the two-card sleeve apparatus on either side of the opaque layer. In another embodiment, the inner surfaces of the transparent layers 104 and 106 may be attached to three sides, top, bottom, and right, of the inner surfaces of the opaque layer 102, forming pockets open on the left edge of the two-card sleeve apparatus for a card to be inserted in the two-card sleeve apparatus on either side of the opaque layer.

Figure 2:
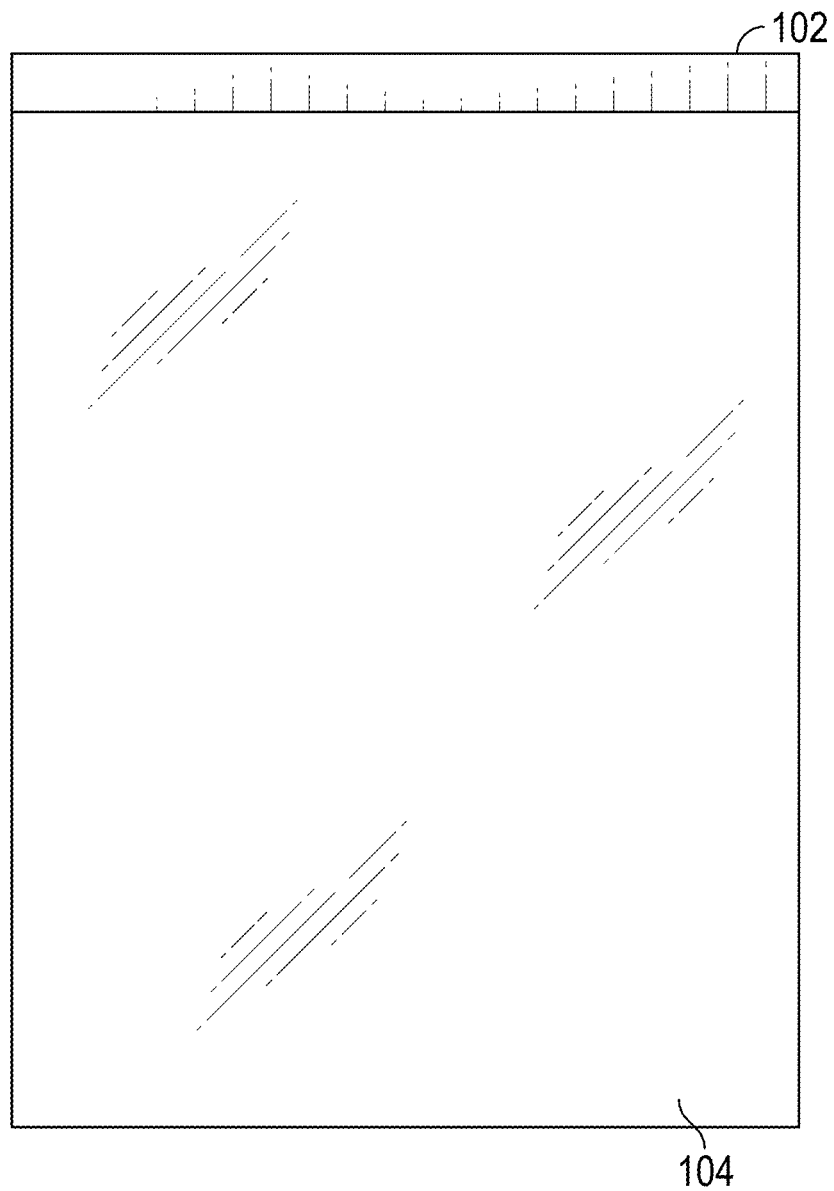
FIG. 2 shows a front view of a two-card sleeve apparatus in one example.
Figure 5:
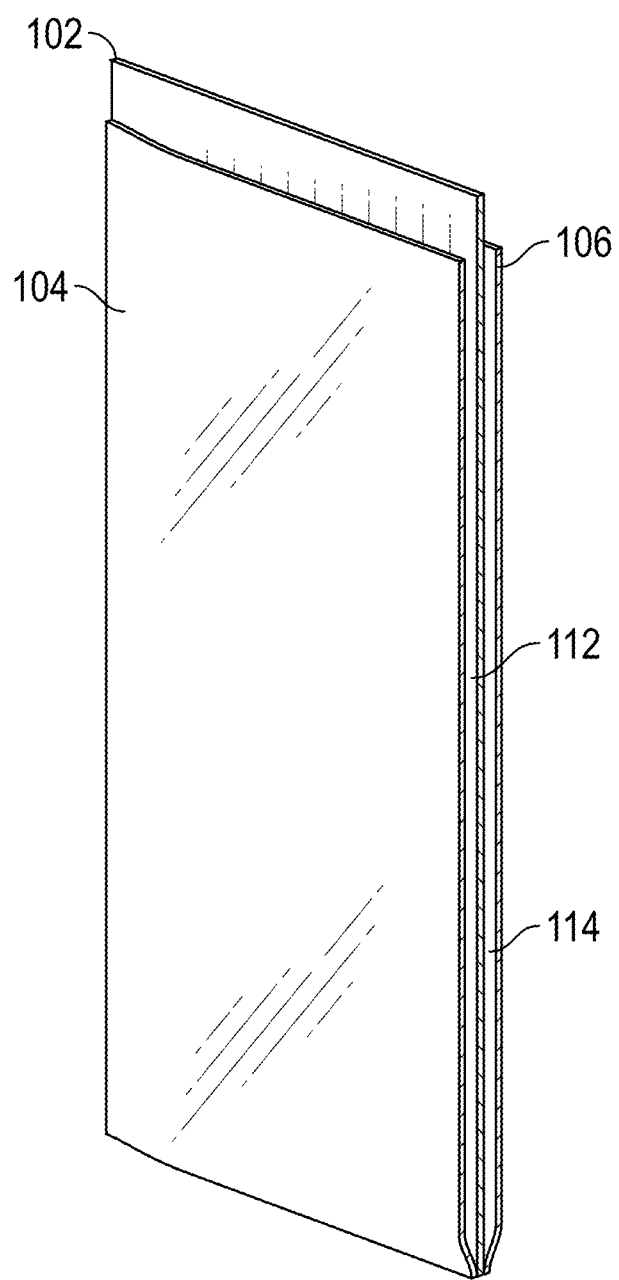
FIG. 5 shows a cross-sectional view of a two-card sleeve apparatus in one example.

As seen in FIGS. 2 and 5, the inner surface of the first transparent layer 104 is attached on three edges to the first inner surface of the opaque layer 102, leaving an opening at the top of the two-card sleeve apparatus. The inner surface of the first transparent layer 104 is attached such that the first inner surface of the opaque layer is adjacent to the inner surface of the first transparent layer, forming the first pocket 112. The first pocket 112 may be operable to receive a trading card.

Figure 3:
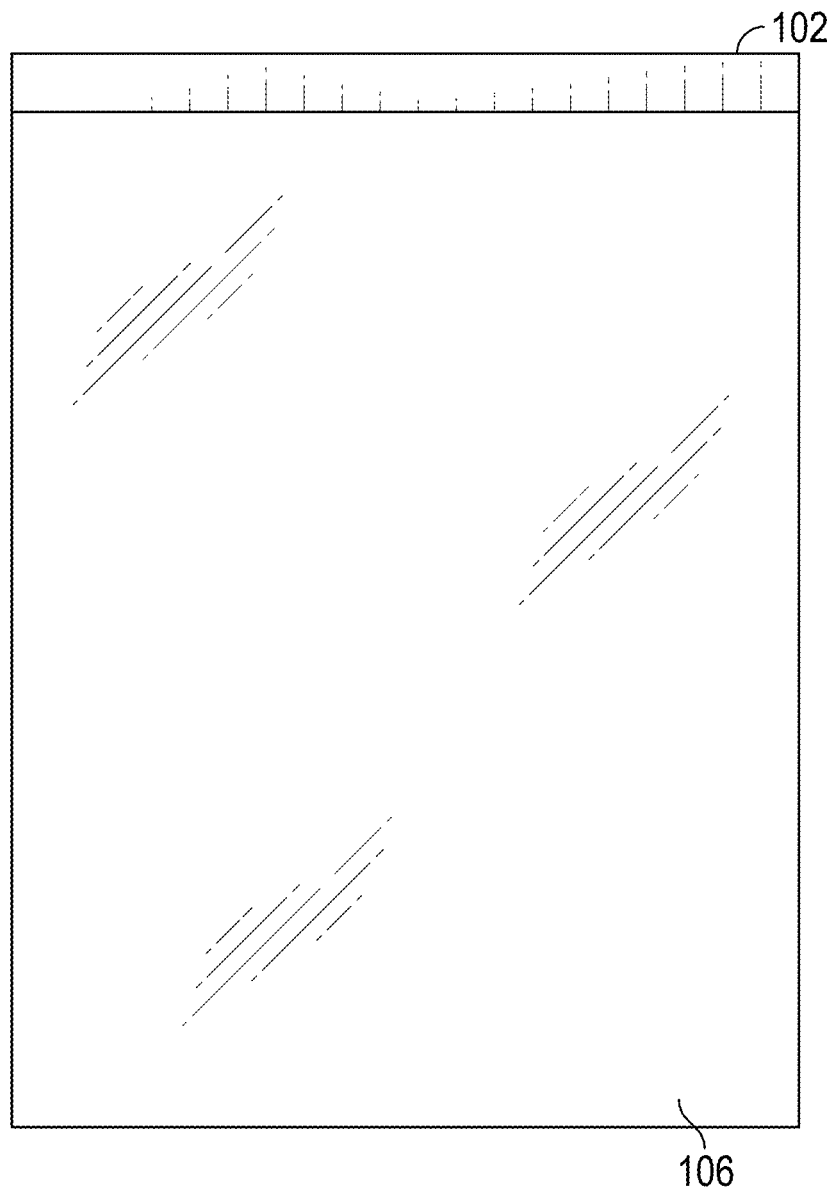
FIG. 3 shows a back view of a two-card sleeve apparatus in one example.

As seen in FIGS. 3 and 5, the second transparent layer 106 is attached on three edges to the second inner surface of the opaque layer 102, leaving an opening at the top of the two-card sleeve apparatus. The inner surface of the second transparent layer 106 is attached such that the second inner surface of the opaque layer is adjacent to the inner surface of the second transparent layer, forming the second pocket 114. The second pocket 114 may be operable to receive a trading card.

The edges of the transparent layers 104 and 106 may be attached to the edges of the opaque layer 102 by many methods including but not limited too heat press, glue, other adhesives, or any other method related to or not related to attaching two plastics together.

The opaque layer may be made of a plastic material that prevents sticking and easily allows the cards to be slid in and out of either the first or second pocket. The opaque layer may be made of any opaque plastic including but not limited to rigid or flexible solid colored plastics, rigid or flexible partially colored plastics, or rigid or flexible partially transparent plastics.

The transparent layers may be made of a transparent plastic material. Non-limiting examples of transparent plastics materials used for the transparent layers may include vinyl, polypropylene material, other polyolefin materials, or other transparent plastics.

In an example, the first transparent layer, second transparent layer, and opaque layer are all flexible. In another example at least one of the first transparent layer, second transparent layer, and opaque layer is rigid. In at least one example, the opaque layer is rigid.

In some embodiments, the opaque layer may be partially transparent, partially colored, or solid colored. For example, the opaque layer may be a solid dark color such that the card stored in the opposing pocket is not visible when viewing from one side.

In various embodiments, the card may be a trading card. The card may be any trading card of standard size. For example, the card may have a width of about 50 mm, about 55 mm, about 60 mm, about 65 mm, about 70 mm, about 75 mm, about 80 mm, about 85 mm, about 90 mm, about 95 mm, or about 100 mm. In additional examples, the card may have a height of about 50 mm, about 55 mm, about 60 mm, about 65 mm, about 70 mm, about 75 mm, about 80 mm, about 85 mm, about 90 mm, about 95 mm, about 100 mm, about 105 mm, about 110 mm, about 115 mm, about 120 mm, or about 125 mm. In further examples, the card may have a thickness of up to about 50 points, about 55 points, about 60 points, about 65 points, about 70 points, about 75 points, about 80 points, about 85 points, about 90 points, about 95 points, about 100 points, about 105 points, about 110 points, about 115 points, about 120 points, about 125 points, about 130 points, about 135 points, about 140 points, about 145 points, about 150 points or about 155 points.

Non-limiting examples of trading cards may include sports trading cards, such as Topps, Upper Deck, and Fleer baseball, basketball, football cards or any other sports card, board game cards, trading cards such as Pokémon and Yu-Gi-Oh, and any other card dimensioned to fit within the pockets of the two-card sleeve apparatus. The cards may be inserted into either the first or second pocket.

In other examples, the first transparent layer 104 may have a height of up to about 50 mm, about 55 mm, about 60 mm, about 65 mm, about 70 mm, about 75 mm, about 80 mm, about 85 mm, about 90 mm, about 95 mm, about 100 mm, about 105 mm, about 110 mm, about 115 mm, about 120 mm, or about 125 mm, and a width of up to about 50 mm, about 55 mm, about 60 mm, about 65 mm, about 70 mm, about 75 mm, about 80 mm, about 85 mm, about 90 mm, about 95 mm, or about 100 mm.

In other examples, the opaque layer 102 may have a height of up to about 50 mm, about 55 mm, about 60 mm, about 65 mm, about 70 mm, about 75 mm, about 80 mm, about 85 mm, about 90 mm, about 95 mm, about 100 mm, about 105 mm, about 110 mm, about 115 mm, about 120 mm, or about 125 mm, and a width of up to about 50 mm, about 55 mm, about 60 mm, about 65 mm, about 70 mm, about 75 mm, about 80 mm, about 85 mm, about 90 mm, about 95 mm, or about 100 mm.

In other examples, the second transparent layer 106 may have a height of up to about 50 mm, about 55 mm, about 60 mm, about 65 mm, about 70 mm, about 75 mm, about 80 mm, about 85 mm, about 90 mm, about 95 mm, about 100 mm, about 105 mm, about 110 mm, about 115 mm, about 120 mm, or about 125 mm, and a width of up to about 50 mm, about 55 mm, about 60 mm, about 65 mm, about 70 mm, about 75 mm, about 80 mm, about 85 mm, about 90 mm, about 95 mm, or about 100 mm.

In at least one example, the first transparent layer and/or the second transparent layer may have a height of 91 mm and a width of 66 mm. In another example, the opaque middle layer may have a height of 91 mm and a width of 66 mm.

As seen in FIG. 5, the connection of the inner surface of the first transparent layer 104 to the first inner surface of the opaque layer 102 forms a first pocket 112 where a trading card can be inserted. The connection of the inner surface of the second transparent layer 106 to the second inner surface of the opaque layer 102 creates a second pocket 114 where a second trading card can be inserted. Therefore, the dimensions of the first and second pockets may be similar to the dimensions of the first and second transparent layers. For example, the first pocket may have a depth of up to 100 mm. The second pocket may have a depth of up to 100 mm. The pockets may hold trading cards having a thickness of up to 155 points.

Figure 4:
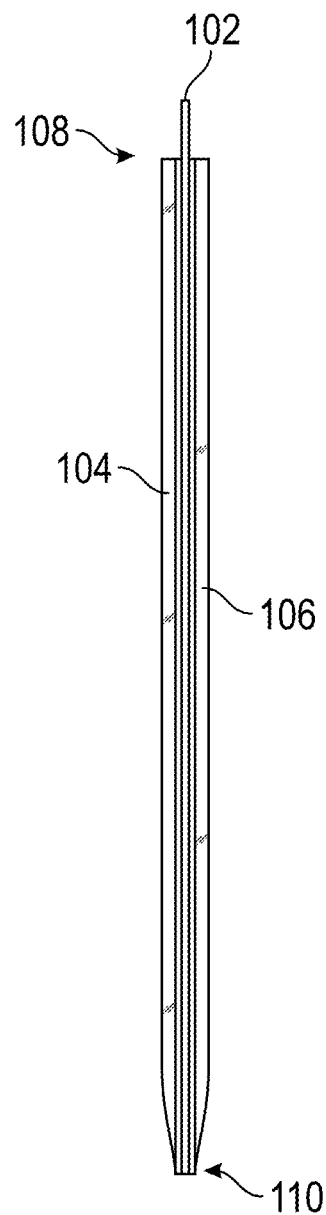
FIG. 4 shows a side view of a two-card sleeve apparatus in one example.
Figure 6:
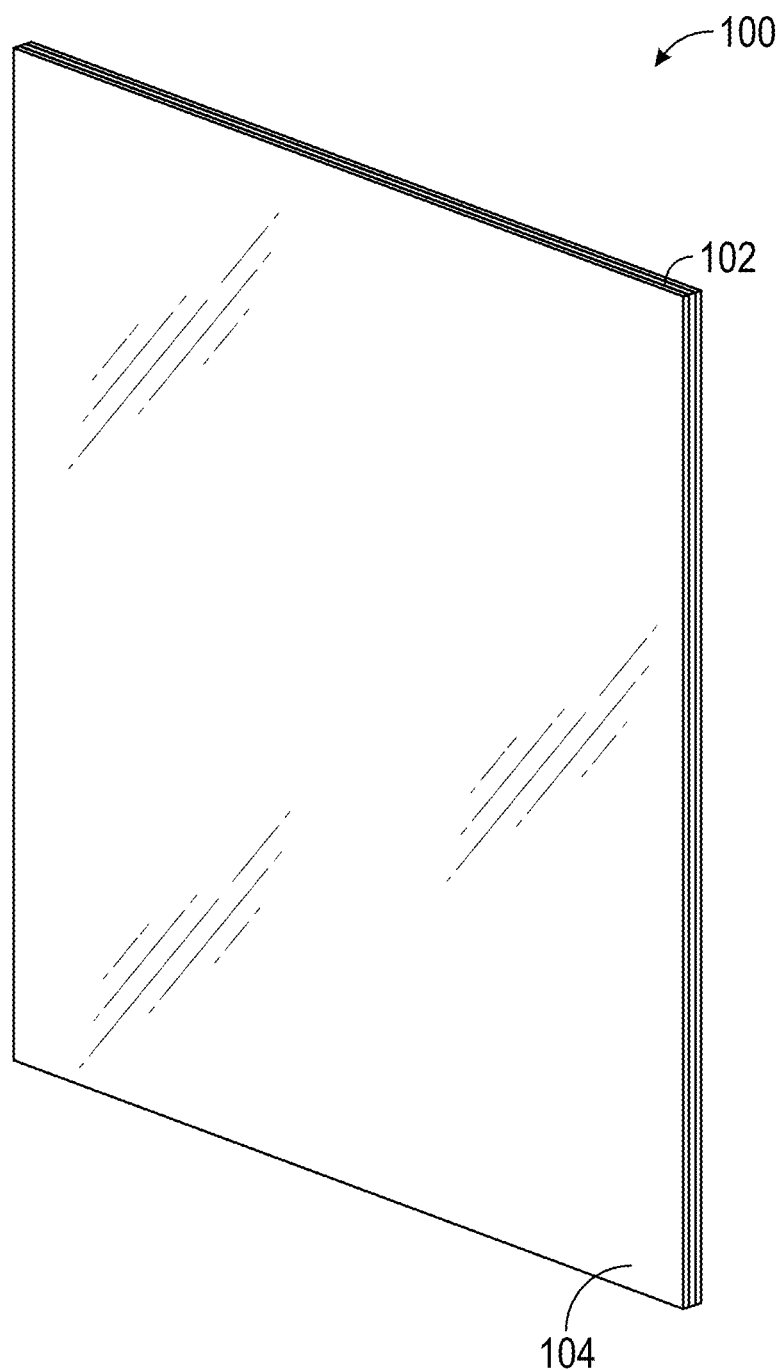
FIG. 6 shows a two-card sleeve apparatus in one example.

In some embodiments, the opaque layer 102 may have a height greater than the heights of the first and second transparent layers 104 and 106 as seen in FIG. 4. In another embodiment, the opaque layer 102 may have a height equal to the heights of the first and second transparent layers 104 and 106, as seen in FIG. 6. In another embodiment, the opaque layer may have a height less than the heights of the first and second transparent layers 104 and 106.

In other examples, the opaque layer 102 may be above the transparent layers 104 and 106 at the top edge 108 as seen in FIG. 4. In another example, the opaque layer 102 may be even with the transparent layers 104 and 106 at the top edge 108 as seen in FIG. 6. In another example, the opaque layer 102 may be below the tops of the transparent layers 104 and 106 at the top edge 108.

As seen in FIG. 4, the top edge 108 of the two-card sleeve apparatus 100 may be rectangular or square. The bottom edge 110 of the card sleeve apparatus 100 may be tapered to provide a space between an inserted trading card and the bottom of the first or second transparent layer. FIG. 1 provides an example where the top and bottom of the two-card sleeve apparatus are both square. In other examples, the top edge of the two-card sleeve apparatus may be tapered.

The disclosures shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the examples described above may be modified within the scope of the appended claims.

What is claimed is:

1. A two-card sleeve for performing a magic trick comprising: a first transparent layer having an inner surface and an outer surface; a second transparent layer having an inner surface and an outer surface; and an opaque layer having a first inner surface and a second inner surface, the opaque layer attached to the first transparent layer and the second transparent layer to form a first pocket and a second pocket, such that the inner surface of the first transparent layer is adjacent to the first inner surface of the opaque layer, forming the first pocket, and the inner surface of the second transparent layer is adjacent to the second inner surface of the opaque layer, forming the second pocket, wherein the first pocket and the second pocket are operable to each hold a playing card or a trading card and the cards are separated by the opaque layer, and wherein the first transparent layer, the second transparent layer, and the opaque layer each have a height of 91 mm and a width of 66 mm.

2. The two-card sleeve of claim 1, wherein the first pocket and the second pocket each are operable to hold a card of up 50 pts. to 80 pts.

3. The two-card sleeve of claim 1, wherein the first transparent layer and the second transparent layer comprise polypropylene.

4. The two-card sleeve of claim 1, wherein the opaque layer is solid colored plastic.

5. The two-card sleeve of claim 1, wherein the opaque layer is partially transparent, partially colored, or solid colored.

6. The two-card sleeve of claim 1, wherein the inner surface of the first transparent layer is attached to first inner surface of the opaque layer along three edges, leaving an opening along a fourth edge.

7. The two-card sleeve of claim 6, wherein the opening is at a top edge or a bottom edge of the two-card sleeve apparatus.

8. The two-card sleeve of claim 1, wherein the inner surface of the second transparent layer is attached to second inner surface of the opaque layer along three edges, leaving an opening along a fourth edge.

9. The two-card sleeve of claim 8, wherein the opening is at a top edge or a bottom edge of the two-card sleeve apparatus.

10. The two-card sleeve of claim 1, wherein a card in the second pocket is not visible when viewing the two-card sleeve from the outer surface of the first transparent layer.

11. The two-card sleeve of claim 1, wherein a card in the first pocket is not visible when viewing the two-card sleeve from the outer surface of the second transparent layer.

* * * * *